US012789423B2

(12) United States Patent
Oh et al.

(10) Patent No.: US 12,789,423 B2
(45) Date of Patent: Nov. 10, 2026

(54) APPARATUS FOR MANUFACTURING POUCH OF SECONDARY BATTERY

(71) Applicant: LG Energy Solution, Ltd., Seoul (KR)

(72) Inventors: Se Young Oh, Daejeon (KR); Jeong Min Ha, Daejeon (KR); Geun Hee Kim, Daejeon (KR); Hyun Beom Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 359 days.

(21) Appl. No.: 18/025,584

(22) PCT Filed: Oct. 19, 2021

(86) PCT No.: PCT/KR2021/014561

§ 371 (c)(1),
(2) Date: Mar. 9, 2023

(87) PCT Pub. No.: WO2022/086114

PCT Pub. Date: Apr. 28, 2022

(65) Prior Publication Data

US 2023/0330900 A1 Oct. 19, 2023

(30) Foreign Application Priority Data

Oct. 23, 2020 (KR) ........................ 10-2020-0138675

(51) Int. Cl.
*B29C 43/36* (2006.01)
*B21D 22/02* (2006.01)
(Continued)

(52) U.S. Cl.
CPC ............ *B29C 43/361* (2013.01); *B21D 22/02* (2013.01); *B21D 22/22* (2013.01); *B21D 24/04* (2013.01);
(Continued)

(58) Field of Classification Search
CPC ......... B29C 43/02; B29C 43/04; B29C 43/36; B65B 47/04; H01M 50/10; B21D 22/02; B21D 22/20; B21D 22/22; B21D 24/04
See application file for complete search history.

(56) References Cited

U.S. PATENT DOCUMENTS 4,195,510 A * 4/1980 Juergens ................ B21D 22/26 72/350
5,901,599 A * 5/1999 Sato ....................... B21D 22/22 72/350
(Continued)

FOREIGN PATENT DOCUMENTS

JP 2020-087902 A 6/2020
KR 20170124882 A 11/2017
(Continued)

OTHER PUBLICATIONS

International Search Report for PCT/KR2021/014561 mailed Jan. 28, 2022. 3 pgs.
(Continued)

*Primary Examiner* — Christopher L Templeton
*Assistant Examiner* — Matthew Stephens
(74) *Attorney, Agent, or Firm* — Lerner David LLP

(57) ABSTRACT

An apparatus for manufacturing a pouch of a secondary battery includes: a lower die having an accommodation groove for molding a cup part of the pouch formed in a base surface, on which the pouch is disposed; a punch inserted into the accommodation groove to mold the cup part; and a stripper provided to press a peripheral portion of the pouch, wherein the stripper and the lower die press and grip upper and lower portions of a peripheral portion of the pouch, respectively, in the state in which the peripheral portion of the pouch is gripped by the stripper and the lower die, the punch is inserted into the accommodation groove to mold the cup part of the pouch, and an anti-pushing groove is
(Continued)

formed in any one of the lower die or the stripper, which presses the peripheral portion of the pouch.

10 Claims, 6 Drawing Sheets

(51) Int. Cl.

| | |
|---|---|
| ***B21D 22/22*** | (2006.01) |
| ***B21D 24/04*** | (2006.01) |
| ***B29C 43/02*** | (2006.01) |
| ***B29C 43/04*** | (2006.01) |
| ***B65B 47/04*** | (2006.01) |
| ***H01M 50/105*** | (2021.01) |

(52) U.S. Cl.
CPC ............ *B29C 43/027* (2013.01); *B29C 43/04* (2013.01); *B65B 47/04* (2013.01); *H01M 50/105* (2021.01)

(56) References Cited

U.S. PATENT DOCUMENTS

| | | | | |
|---|---|---|---|---|
| 7,861,568 | B2 * | 1/2011 | Nakamura | B21D 25/04 72/350 |
| 8,128,859 | B2 | 3/2012 | Dey et al. | |
| 10,622,597 | B2 | 4/2020 | Yoo et al. | |
| 2010/0209764 | A1 * | 8/2010 | Heo | B29C 45/14639 264/272.21 |
| 2020/0168853 | A1 | 5/2020 | Kim et al. | |
| 2020/0406528 | A1 | 12/2020 | Jung et al. | |

FOREIGN PATENT DOCUMENTS

| | | | | |
|---|---|---|---|---|
| KR | 20180055427 | A | 5/2018 | |
| KR | 101904094 | B1 | 10/2018 | |
| KR | 20180118929 | A | 11/2018 | |
| KR | 20190038094 | A | 4/2019 | |
| KR | 20190092017 | A | 8/2019 | |
| KR | 20190098581 | A | 8/2019 | |
| KR | 20190105765 | A * | 9/2019 | H01M 2/02 |
| KR | 1020200061034 | A | 6/2020 | |
| KR | 102145494 | B1 | 8/2020 | |
| KR | 2020-0117177 | A | 10/2020 | |

OTHER PUBLICATIONS

Extended European Search Report including Written Opinion for Application No. 21883183.2 dated Mar. 11, 2024, pp. 1-10.

Search Report dated Jul. 16, 2025 from the Office Action for Chinese Application No. 202180051314.2 issued Jul. 17, 2025, pp. 1-2.

* cited by examiner

APPARATUS FOR MANUFACTURING POUCH OF SECONDARY BATTERY

CROSS-REFERENCE TO RELATED APPLICATIONS

The present application is a national phase entry under 35 U.S.C. § 371 of the International Application No. PCT/KR2021/014561 filed on Oct. 19, 2021, which claims priority to Korean Patent Application No. 10-2020-0138675, filed on Oct. 23, 2020, the disclosures of which are incorporated herein by reference in their entireties.

FIELD OF THE INVENTION

The present invention relates to an apparatus for manufacturing a pouch of a secondary battery, and more particularly, to an apparatus for manufacturing a pouch of a secondary battery, which is capable of relieving or removing pouch wrinkles occurring when a pouch base material is non-uniformly suctioned because a die and a stripper are unbalanced or asymmetrical with each other during molding of the pouch.

BACKGROUND OF THE INVENTION

In recent years, the price of energy sources increases due to the depletion of fossil fuels, the interest in environmental pollution is amplified, and the demand for eco-friendly alternative energy sources is becoming an indispensable factor for future life. Accordingly, studies on various power generation technologies such as solar power, wind power, and tidal power are continuing, and power storage devices such as batteries for more efficiently using the generated electrical energy are also of great interest.

Furthermore, as technology development and demand for electronic mobile devices and electric vehicles using batteries increase, the demands for batteries as energy sources are rapidly increasing. Thus, many studies on batteries which are capable of meeting various demands have been conducted.

In particular, in terms of materials, there is a high demand for lithium secondary batteries such as lithium ion batteries and lithium ion polymer batteries having advantages such as high energy density, discharge voltage, and output stability.

The secondary batteries are classified into cylindrical batteries and prismatic batteries, in which an electrode assembly is embedded in a cylindrical or prismatic metal can, and pouch-type batteries, in which an electrode assembly is embedded in a pouch-type case made of an aluminum laminate sheet according to shapes of battery cases.

FIG. 1 illustrates an example of a pouch-type secondary battery. A pouch-type secondary battery 1 includes an electrode assembly 20, in which electrodes and separators are alternately stacked, and a pouch 10, into which the electrode assembly is inserted. In addition, the pouch includes cup parts 11 and 12 of the pouch, each of which has a recessed shape so that the electrode assembly is directly accommodated. The cup parts of the pouch are provided with the cup part 11 of a left pouch and the cup part 12 of a right pouch to surround the electrode assembly at both sides. A peripheral portion 14 of the pouch is formed around the periphery of each of the cup parts of the pouch to seal the pouch from the outside.

Particularly, the pouch illustrated in FIG. 1 may be a V-shaped pouch 10. According to the related art, the pouch has been manufactured in a flat form. However, in recent, the pouch may be manufactured as a V-shaped pouch so that the pouch is neatly manufactured to prevent a protrusion from occurring on an outer appearance of the pouch during a pouch folding process. In addition, such a V-shaped pouch may be manufactured through an apparatus for manufacturing the pouch, which is formed as a molding die.

However, when the pouch is molded using a die for manufacturing such a V-shaped pouch, the pouch base material is non-uniformly suctioned into the pouch because the lower die and a stripper are unbalanced or asymmetrical with each other during the molding of the pouch to cause wrinkles on the pouch.

FIG. 2 is a view illustrating a state in which pouch wrinkles occur between a cup part 11 of a left pouch and a cup part 12 of a right pouch (see dotted line of FIGS. 1 and 2).

BRIEF SUMMARY OF THE INVENTION

The present invention has been devised to solve the above problems, and an object of the present invention is to provide an apparatus for manufacturing a pouch of a secondary battery, which is capable of relieving or removing pouch wrinkles occurring when a pouch base material is non-uniformly suctioned because a die and a stripper are unbalanced or asymmetrical with each other during molding of the pouch.

An apparatus for manufacturing a pouch of a secondary battery according to the present invention includes: a lower die, in which an accommodation groove for molding a cup part of the pouch is formed in a base surface, on which the pouch is disposed; a punch inserted into the accommodation groove of the lower die to mold the cup part of the pouch; and a stripper provided to press a peripheral portion of the pouch, which is disposed in the periphery of a portion to be molded into the cup part of the pouch by the punch, wherein the stripper and the die press and grip upper and lower portions of a peripheral portion of the pouch, respectively, in the state in which the peripheral portion of the pouch is gripped by the stripper and the lower die, the punch is inserted into the accommodation groove to mold the cup part of the pouch, and an anti-pushing groove is formed in any one of the lower die or the stripper, which presses the peripheral portion of the pouch.

The anti-pushing groove may be formed in the base surface of the lower die, and an anti-pushing protrusion having a protruding shape, protruding from a position corresponding to the anti-pushing groove, and inserted into the anti-pushing groove may be formed on the stripper.

The anti-pushing groove may be formed in the stripper, and an anti-pushing protrusion having a protruding shape, protruding from a position corresponding to the anti-pushing groove, and inserted into the anti-pushing groove may be formed on a pressing surface of the lower die.

Two accommodation grooves, i.e., a left accommodation groove and a right accommodation groove may be formed in the lower die, a bridge part configured to connect the two accommodation grooves to each other may be formed between the left accommodation groove and the right accommodation groove, and the anti-pushing groove may be formed in the base surface on an outer peripheral area of a molding area comprising the left accommodation groove, the right accommodation groove, and the bridge part.

The anti-pushing groove may include a first anti-pushing groove and a second anti-pushing groove, wherein, in a plan view of the lower die, the first anti-pushing groove may be provided in a shape extending in left and right directions at a position spaced a predetermined distance upward from the bridge part, and the second anti-pushing groove may be provided in a shape extending in the left and right directions at a position spaced a predetermined distance downward from the bridge part.

The anti-pushing groove may include a third anti-pushing groove and a fourth anti-pushing groove, wherein, in a plan view of the lower die, the third anti-pushing groove may be provided in a shape extending in a vertical direction at a position spaced a predetermined distance from the left accommodation groove to a left side, and the fourth anti-pushing groove may be provided in a shape extending in the vertical direction at a position spaced a predetermined distance from the right accommodation groove to a right side.

In the plan view of the lower die, each of the first anti-pushing groove, the second anti-pushing groove, the third anti-pushing groove, and the fourth anti-pushing groove may be formed in a rectangular shape.

In the plan view of the lower die, each of the first anti-pushing groove and the second anti-pushing groove may have a length less than that of the accommodation groove in a width direction, and each of the third anti-pushing groove and the fourth anti-pushing groove may be formed to have a length equal to or greater than that of the accommodation groove in a longitudinal direction.

The first anti-pushing groove and the second anti-pushing groove may be symmetrical with respect to a virtual line (L) extending from the bridge part.

The first anti-pushing groove may be formed at a position spaced a distance of 5 mm or more upward from an upper end of the bridge part, and the second anti-pushing groove may be formed at a position spaced a distance of 5 mm or more downward from a lower end of the bridge part.

An apparatus for manufacturing a pouch of a secondary battery according to the present invention includes: a lower die, in which an accommodation groove for molding a cup part of the pouch is formed in a base surface, on which the pouch is disposed; a punch inserted into the accommodation groove of the lower die to mold the cup part of the pouch; and a stripper provided to press a peripheral portion of the pouch, which is disposed in the periphery of a portion to be molded into the cup part of the pouch by the punch, wherein the stripper and the die press and grip upper and lower portions of a peripheral portion of the pouch, respectively, in the state in which the peripheral portion of the pouch is gripped by the stripper and the lower die, the punch is inserted into the accommodation groove to mold the cup part of the pouch, and an anti-pushing groove is formed in any one of the lower die or the stripper, which presses the peripheral portion of the pouch, and accordingly, pouch wrinkles occurring when a pouch base material is non-uniformly suctioned may be relieved or removed because a die and a stripper are unbalanced or asymmetrical with each other during molding of the pouch.

Figure 1:
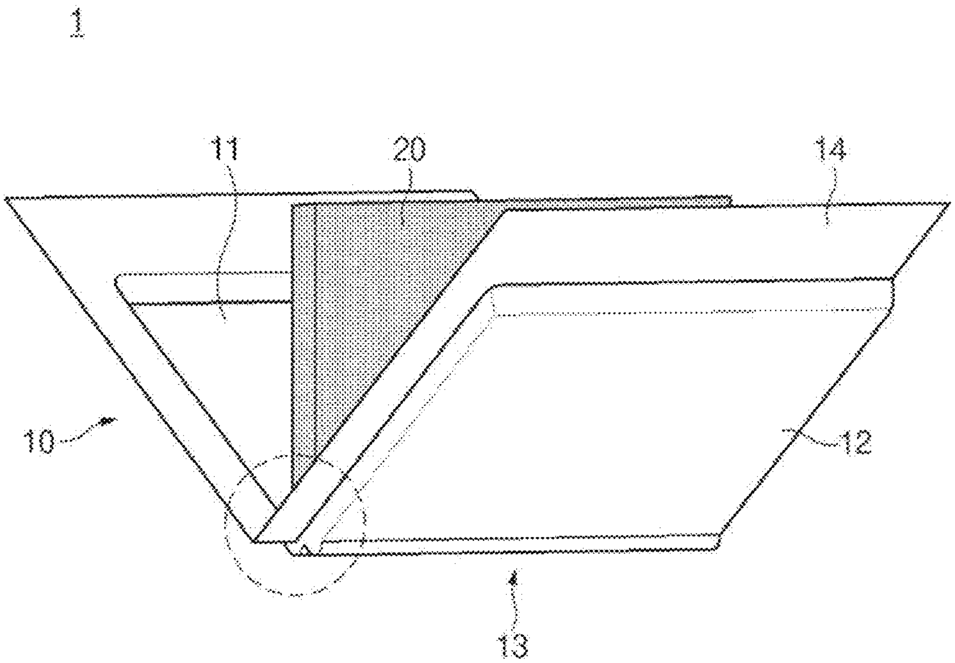
FIG.1 (PRIOR ART)
FIG. 1 is an exploded perspective view of a V-shaped pouch and an electrode assembly, which is embedded in the V-shaped pouch.
Figure 2:
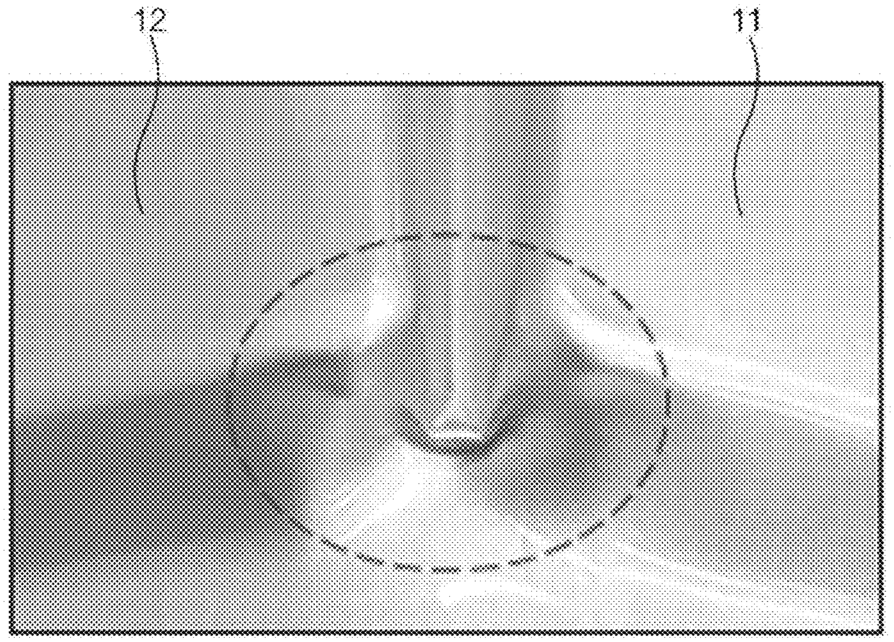
FIG.2 (PRIOR ART)
FIG. 2 is a perspective view illustrating a shape of a region indicated by a dotted line of FIG. 1 when viewed from below.

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain the present invention, detailed descriptions of portions that are irrelevant to the description or related known technologies that may unnecessarily obscure the gist of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Embodiment 1

Figure 3:
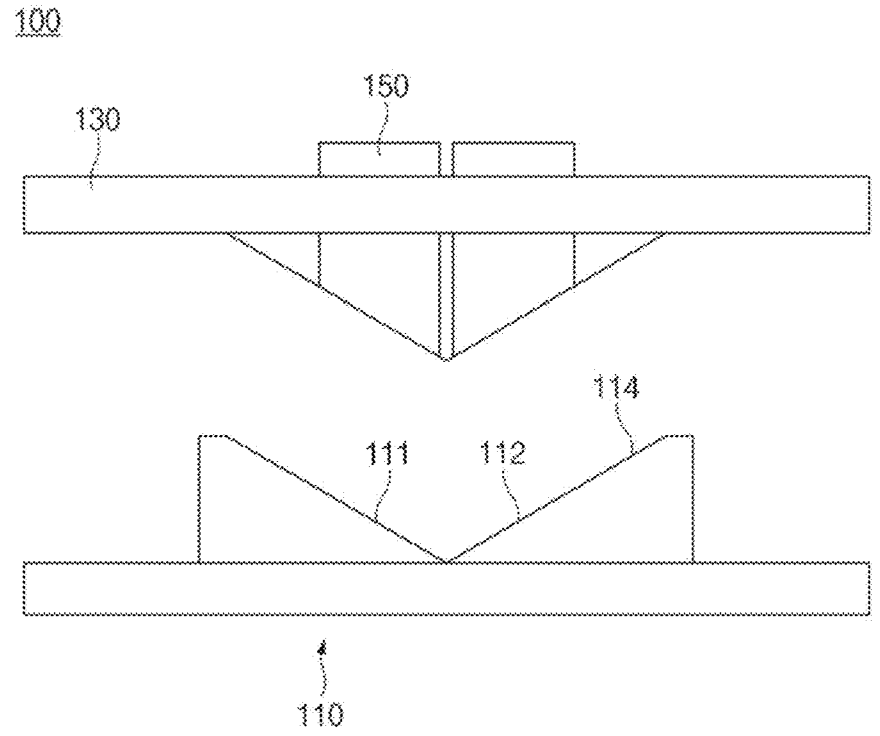
FIG. 3 is a front view illustrating an apparatus for manufacturing a pouch of a secondary battery, i.e., a state in which a punch and a stripper are far away from a lower die before molding of the pouch according to the present invention.
Figure 4:
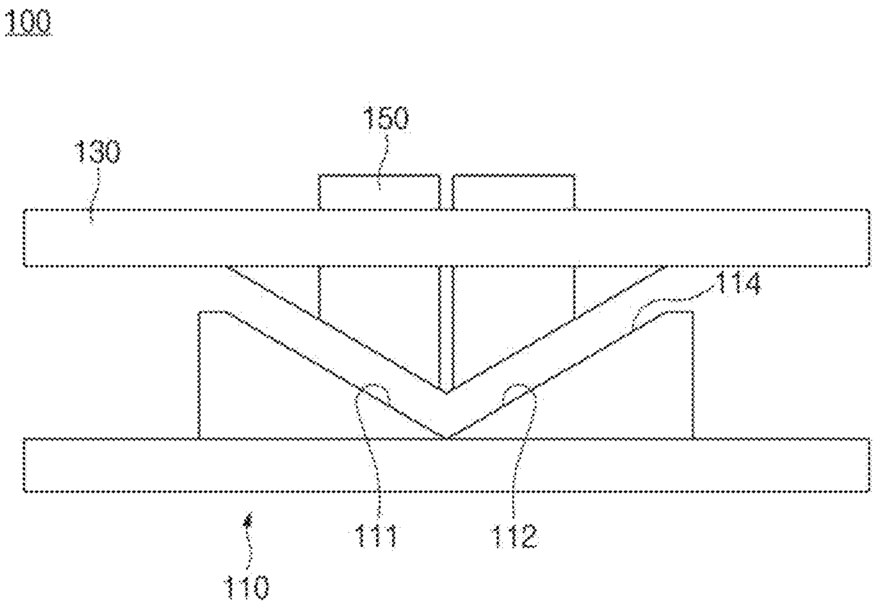
FIG. 4 is a front view illustrating the apparatus for manufacturing the pouch of the secondary battery, i.e., a state in which the punch and the stripper are close to the lower die to mold the pouch according to the present invention.
Figure 5:
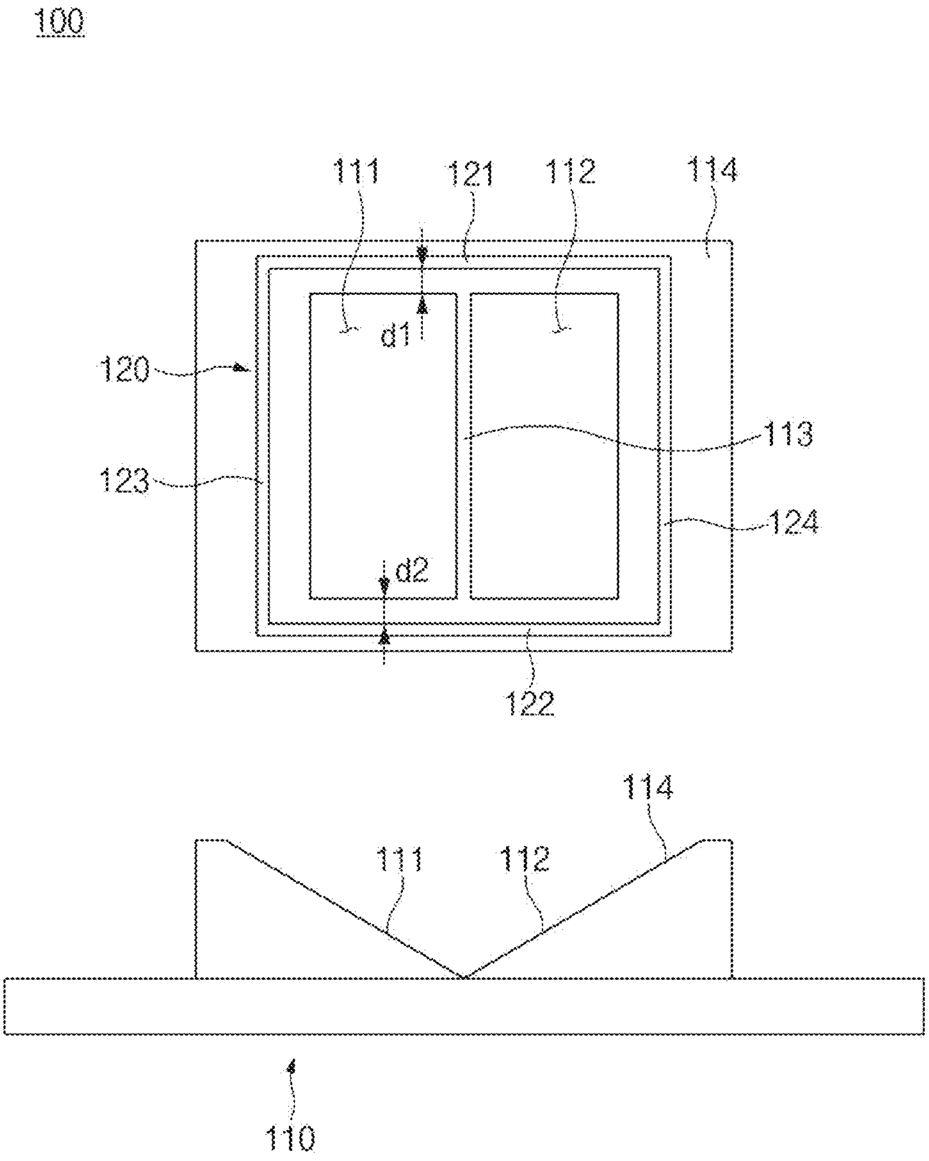
FIG. 5 is front and plan views of a lower die in an apparatus for manufacturing a pouch of a secondary battery according to Embodiment 1 of the present invention.
Figure 6:
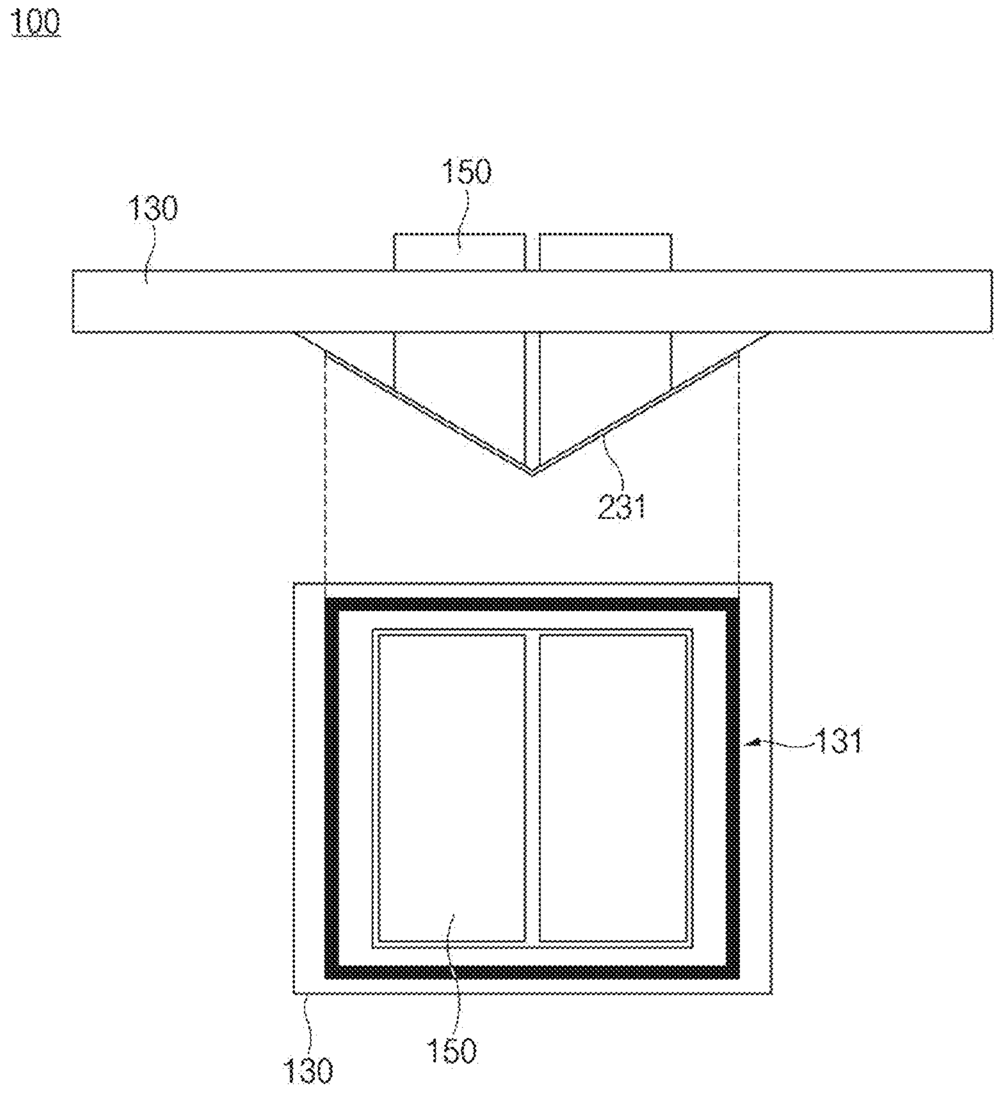
FIG. 6 is front and bottom views of a stripper and a punch in an apparatus for manufacturing a pouch of a secondary battery according to Embodiment 1 of the present invention.

FIG. 3 is a front view illustrating an apparatus for manufacturing a pouch of a secondary battery, i.e., a state in which a punch and a stripper are far away from a lower die before molding of the pouch according to the present invention. FIG. 4 is a front view illustrating the apparatus for manufacturing the pouch of the secondary battery, i.e., a state in which the punch and the stripper are close to the lower die to mold the pouch according to the present invention. FIG. 5 is front and plan views of a lower die in an apparatus for manufacturing a pouch of a secondary battery according to Embodiment 1 of the present invention. In FIG. 5, an upper drawing is a plan view (a base surface when viewed from above), and a lower drawing is a front view. FIG. 6 is front and bottom views of a stripper and a punch in an apparatus for manufacturing a pouch of a secondary battery according to Embodiment 1 of the present invention. FIG. 6, an upper drawing is a front view, and a lower drawing is a bottom view.

Referring to FIGS. 3 to 6, an apparatus 100 for manufacturing a pouch of a secondary battery according to Embodiment 1 of the present invention includes a lower die 110, a punch 150, and a stripper 130.

The lower die 110 may be positioned below to mold the pouch and may have a base surface 114, on which the pouch is disposed, on an upper portion thereof. In addition, the lower die 110 has accommodation grooves 111 and 112 for molding a cup part of the pouch on the base surface 114 on which the pouch is disposed. The punch 150 may be configured to mold the cup part of the pouch while being inserted into the accommodation grooves of the lower die 110. The stripper 130 may be configured to press a peripheral portion of the pouch, which is disposed in the periphery of a portion to be molded into the cup part of the pouch, from an upper side by the punch 150.

The stripper 130 and the lower die 110 may grip upper and lower portion of the peripheral portion of the pouch, respectively, and in the state in which the peripheral portion of the pouch is gripped by the stripper 130 and the lower die 110, the punch 150 may be inserted into the accommodation grooves to mold the cup part of the pouch.

The V-shaped pouch of the secondary battery as illustrated in FIG. 1 may be manufactured through the apparatus 100 for manufacturing the pouch of the secondary battery according to Embodiment 1 of the present invention, which has the above-described configuration.

Also, in the apparatus 100 for manufacturing the pouch of the secondary battery according to Embodiment 1 of the present invention, an anti-pushing groove 120 is formed in one of a lower die 110 or a stripper 130, which processes a peripheral portion of the pouch.

For example, referring to FIGS. 5 and 6, the anti-pushing groove 120 may be formed in a base surface 114 of the lower die 110. Also, an anti-pushing protrusion 131 may be formed on the stripper 130 to correspond to the anti-pushing groove 120. The anti-pushing protrusion 131 may have a protruding shape, protrude from a position corresponding to the anti-pushing groove 120, and be inserted into the anti-pushing groove 120.

Of course, only the positions of the anti-pushing groove 120 and the anti-pushing protrusion 131 may be exchanged with each other.

That is, the anti-pushing groove 120 may be formed in the stripper 130, and correspondingly, the anti-pushing protrusion 131 may be formed on the lower die 110 (not shown). Specifically, when the anti-pushing groove 120 is provided on an area around a molding part in the stripper 130, the anti-pushing protrusion 131 having the protruding shape, protruding from the position corresponding to the anti-pushing groove 120, and inserted into the anti-pushing groove 120 may be formed on a pressing surface of the lower die 110.

In Embodiment 1, for convenience, the anti-pushing groove 120 is formed in the base surface 114 of the lower die 110, and the anti-pushing protrusion 131 is formed on the stripper 130 to correspond to the anti-pushing groove 120. However, this is only for convenience of explanation and is not intended to limit the scope of rights.

Two accommodation grooves, i.e., a left accommodation groove 111 and a right accommodation groove 112 may be formed in the lower die 110. The cup part of the left pouch may be formed through the left accommodation groove 111, and the cup part of the right pouch may be formed through the right accommodation groove 112. A bridge part 113 connecting the two accommodation grooves to each other may be formed between the left accommodation groove 111 and the right accommodation groove 112.

In this case, the anti-pushing groove 120 is formed in the base surface 114 on an outer peripheral area of a molding area including a left accommodation groove 111, a right accommodation groove 112, and a bridge part 113.

As described above, the anti-pushing groove 120 and the anti-pushing protrusion 131 are formed on a peripheral area of the molding area to hold a peripheral portion of the pouch. Also, since a pouch base material is fitted together while the groove and the protrusion are fitted into each other, the pouch base material may not easily move, and as a result, a range of movement of the pouch base material may be limited. In this principle, when molding the pouch, it is possible to relieve or remove pouch wrinkles occurring when the pouch base material is non-uniformly suctioned because the die and the stripper are unbalanced or asymmetrical with each other during the molding of the pouch.

If it is assumed that there is no anti-pushing groove 120 and anti-pushing protrusion 131, when a left portion of the lower die 110 and a left portion of the stripper 130 are in contact with each other prior to right sides so as to be pressed, the pouch base material may asymmetrically move to left and right sides during descending of the pouch 150 to cause uneven wrinkles. However, in the present invention, even if the left portion of the lower die 110 and the left portion of the stripper 130 are in contact with each other prior to the right sides, since the anti-pushing groove 120 and the anti-pushing protrusion 131 are in contact with each other at the right side to hole the right pouch base material before force is applied in earnest to the pouch base material at the left side so that the pouch base material moves, a phenomenon in which the left and right sides of the pouch base material non-uniformly move to be inserted into the accommodation groove may be prevented from occurring. Thus, it is possible to prevent wrinkles from being induced on the pouch.

In this case, the same principle may be applied not only in the left and right directions but also in the vertical direction, and thus, the same effect may be exhibited.

Specifically, referring to FIG. 5, in the apparatus 100 for manufacturing the pouch of the secondary battery according to Embodiment 1 of the present invention, the anti-pushing groove 120 may include a first anti-pushing groove 121 and a second anti-pushing groove 122. In the plan view of the lower die 110, the first anti-pushing groove 121 may be provided in a shape extending in the left and right directions at a position spaced a predetermined distance upward from the bridge part 113. Also, the second anti-pushing groove 122 may be provided in a shape extending in the left and right directions at a position spaced a predetermined distance downward from the bridge part 113.

In addition, the anti-pushing groove 120 may include a third anti-pushing groove 123 and a fourth anti-pushing groove 124. Also, in the plan view of the lower die 110, the third anti-pushing groove 123 may be provided in a shape extending in the vertical direction at a position spaced a predetermined distance from the left accommodation groove 111 to a left side. The fourth anti-pushing groove 124 may be provided in a shape extending in the vertical direction at a position spaced a predetermined distance from the right accommodation groove 112 to a right side.

When all the first anti-pushing groove 121, the second anti-pushing groove 122, the third anti-pushing groove 123, and the fourth anti-pushing groove 124 are formed, as illustrated in FIG. 5, in the plan view of the lower die 110, each of the first anti-pushing groove 121, the second anti-pushing groove 122, the third anti-pushing groove 123, and the fourth anti-pushing groove 124 may be formed in a rectangular shape. As a result, the molding of the pouch is possible while holding the pouch base material in all directions.

The first anti-pushing groove 121 may be formed at a position spaced a distance of 5 mm or more upward from an upper end of the bridge part 113. That is, a distance d1 in FIG. 5 may be 5 mm or more. Similarly, the second anti-pushing groove 122 may be formed at a position spaced a distance of 5 mm or more downward from a lower end of the bridge part 113. That is, a distance d2 in FIG. 5 may be 5 mm or more.

When the pouch is molded while the punch 150 is inserted into the accommodation groove, a predetermined amount of pouch base material is suctioned into the accommodation groove while being stretched to some extend is required especially around the bridge. Thus, when each of the distances d1 and d2 is less than 5 mm, the stretchable amount may be insufficient to cause a phenomenon in which some areas of the pouch are broken. Therefore, when each of the distances d1 and d2 is formed to be 5 mm or more, it is possible to safely manufacture good products without fear of the breakage.

Embodiment 2

Figure 7:
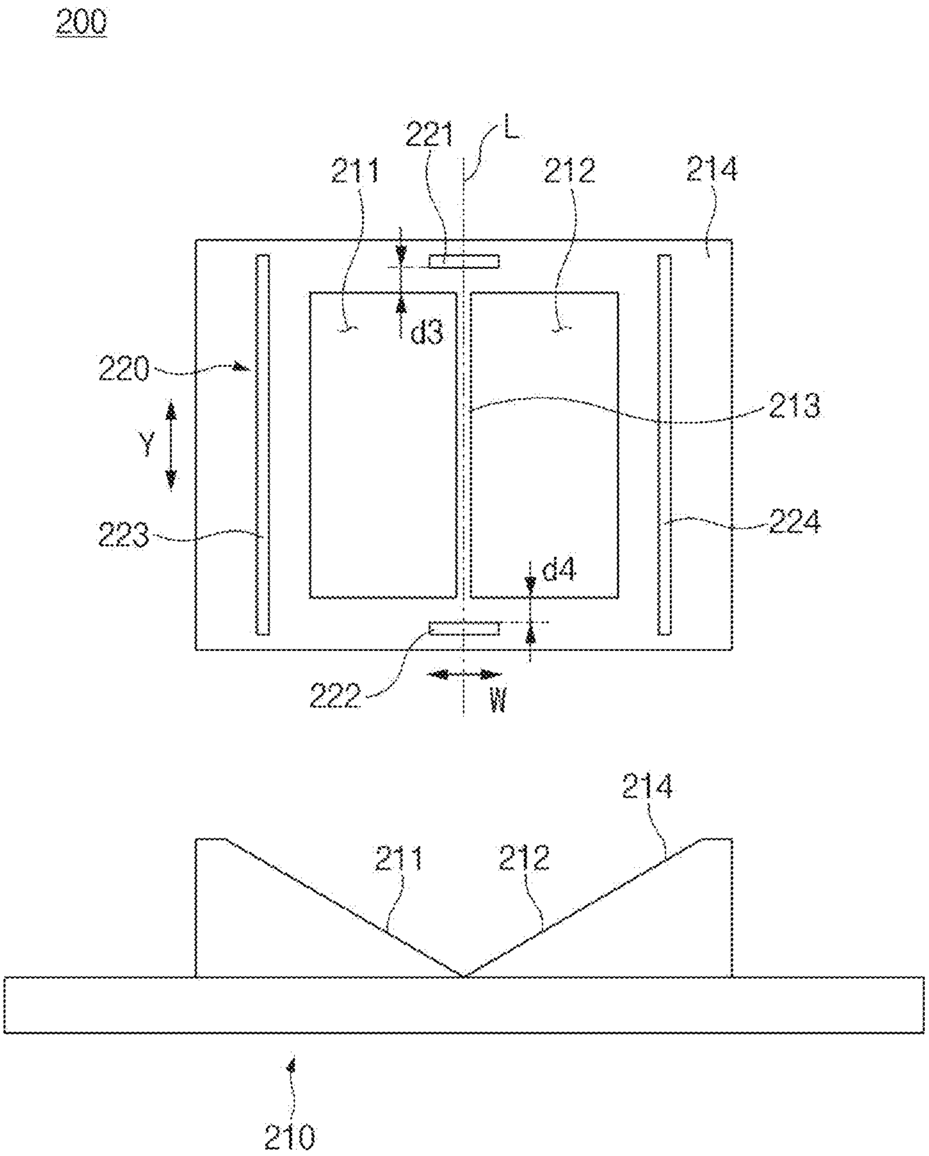
FIG. 7 is front and plan views of a lower die in an apparatus for manufacturing a pouch of a secondary battery according to Embodiment 2 of the present invention.
Figure 8:
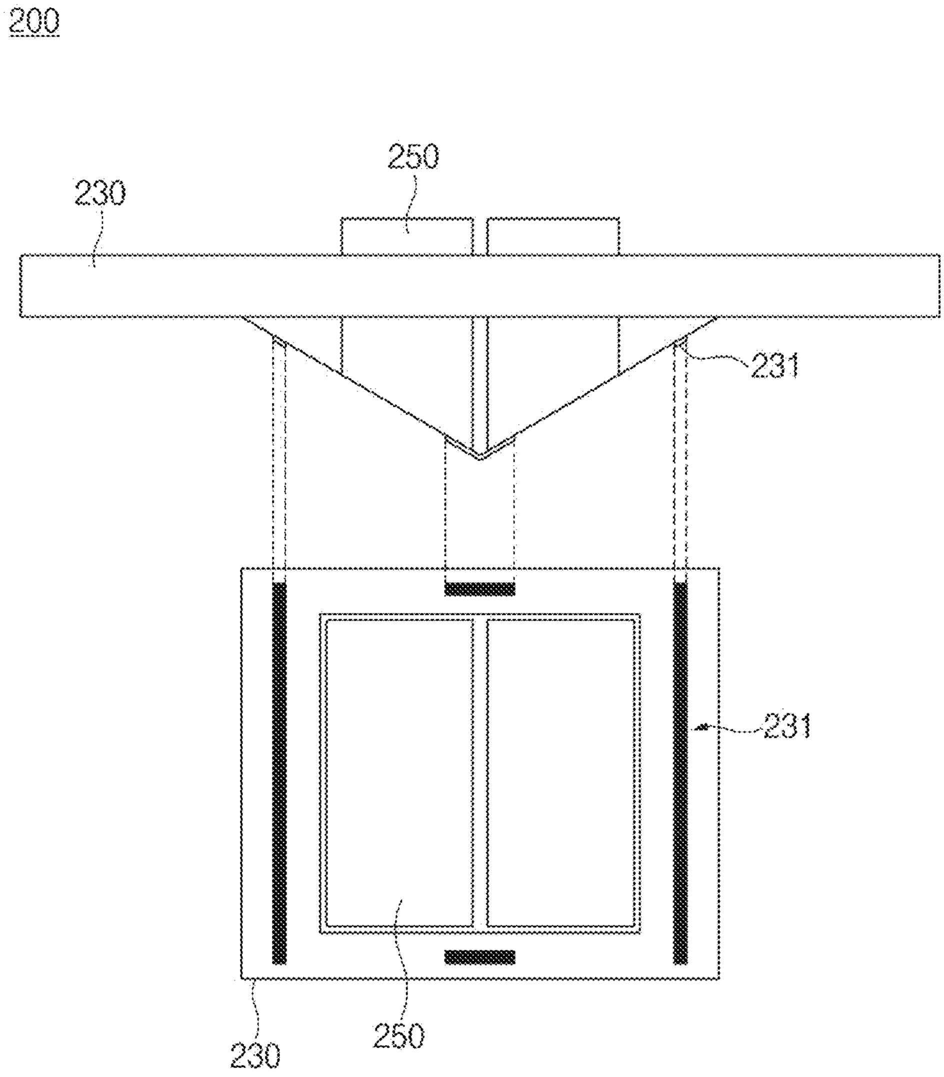
FIG. 8 is front and bottom views of a stripper and a punch in an apparatus for manufacturing a pouch of a secondary battery according to Embodiment 2 of the present invention.

FIG. 7 is front and plan views of a lower die in an apparatus for manufacturing a pouch of a secondary battery according to Embodiment 2 of the present invention. FIG. 8 is front and bottom views of a stripper and a punch in an apparatus for manufacturing a pouch of a secondary battery according to Embodiment 2 of the present invention.

Embodiment 2 of the present invention is different from Embodiment 1 in that a portion of an anti-pushing groove has a different shape.

The contents that are duplicated with Embodiment 1 will be omitted as much as possible, and Embodiment 2 will be described with a focus on the differences. That is, it is obvious that the contents that are not described in Embodiment 2 may be regarded as the contents of Embodiment 1 if necessary.

Referring to FIGS. 7 and 8, in an apparatus 200 for manufacturing a pouch of a secondary battery according to Embodiment 2 of the present invention, an anti-pushing groove 220 may be formed in a base surface 214 of a lower die 210, and an anti-pushing protrusion 231 may be formed on a stripper 230 to correspond to the anti-pushing groove 220. The anti-pushing protrusion 231 formed on the stripper 230 may have a protruding shape, protrude from a position corresponding to the anti-pushing groove 220, and be inserted into the anti-pushing groove 220.

Two accommodation grooves, i.e., a left accommodation groove 211 and a right accommodation groove 212 may be formed in the lower die 210. The cup part of the left pouch may be formed through the left accommodation groove 211, and the cup part of the right pouch may be formed through the right accommodation groove 212. A bridge part 213 connecting the two accommodation grooves to each other may be formed between the left accommodation groove 211 and the right accommodation groove 212.

The anti-pushing groove 220 may include a first anti-pushing groove 221 and a second anti-pushing groove 222. In the plan view of the lower die 210, the first anti-pushing groove 221 may be provided in a shape extending in the left and right directions at a position spaced a predetermined distance upward from the bridge part 213. Also, the second anti-pushing groove 222 may be provided in a shape extending in the left and right directions at a position spaced a predetermined distance downward from the bridge part 213.

Here, in the apparatus 200 for manufacturing the pouch of the secondary battery according to the second embodiment of the present invention, each of the first anti-pushing groove 221 and the second anti-pushing groove 222 may have a length less than that of an accommodation groove in a width direction W. That is, the first anti-pushing groove 221 may have a length less than that from a left end of a left accommodation groove 211 to an end of a right accommodation groove 212 in the width direction W. Similarly, the second anti-pushing groove 222 may have a length less than that from the left end of the left accommodation groove 211 to the end of the right accommodation groove 212 in the width direction W.

In addition, the anti-pushing groove 220 may include a third anti-pushing groove 223 and a fourth anti-pushing groove 224. In the plan view of the lower die 210, the third anti-pushing groove 223 may be provided in a shape extending a vertical direction at a position spaced a predetermined distance from the left accommodation groove 211 to a left side, and the fourth anti-pushing groove 224 may be provided in a shape extending in the vertical direction at a position spaced a predetermined from the right accommodation groove 212 to a right side.

In this case, each of the third anti-pushing groove 223 and the fourth anti-pushing groove 224 may be formed to have a length equal to or greater than that of the accommodation groove in a longitudinal direction Y. That is, the length of the third anti-pushing groove 223 may be greater than that of the left accommodation groove 211 in the longitudinal direction Y of the accommodation groove. Alternatively, the length of the left accommodation groove 211 may be the same as the length of the third anti-pushing groove 223. In the same manner, the length of the fourth anti-pushing groove 224 may be greater than that of the right accommodation groove 212 in the longitudinal direction Y of the accommodation groove. Alternatively, the length of the right accommodation groove 212 may be the same as the length of the fourth anti-pushing groove 224. In addition, the third anti-pushing groove 223 and the fourth anti-pushing groove 224 may have the same length.

Also, referring to FIG. 7, in the apparatus 200 for manufacturing the pouch of the secondary battery according to Embodiment 2 of the present invention, the first anti-pushing groove 221 and the second anti-pushing groove 222 may be symmetrical with respect to a virtual line L extending from the bridge part 213. Also, in this case, the first anti-pushing groove 221 may have a length less than that of any one of the left accommodation groove 211 or the right accommodation groove 212 in a width direction. The second anti-pushing groove 222 may also have a length less than that of any one of the left accommodation groove 211 or the right accommodation groove 212 in a width direction. In addition, the first anti-pushing groove 221 and the second anti-pushing groove 222 may have the same length.

In the apparatus for manufacturing the pouch of the secondary battery according to Embodiment 2 of the present invention, each of the first anti-pushing groove 221 and the second anti-pushing groove 222 may have a length less than that of each of the third anti-pushing groove 223 and the fourth anti-pushing groove 224. In the case of forming a V-shaped pouch, since the left portion of the lower die 210 and the right portion of the lower die 210, which form a V shape, and the left portion of the stripper 230 and the right portion of the stripper 230, which correspond to the left and right portions of the lower die 210, are not horizontal or symmetrical to each other, the third anti-pushing groove 223 and the fourth anti-pushing groove 224 formed on the left and right sides are formed to be long, and the first anti-pushing groove 221 and the second anti-pushing groove 222 formed on the upper and lower sides that are relatively less horizontal may be formed to be short. Thus, the same effect may be obtained with the smaller length or the smaller groove shape, and this may mean that the apparatus 200 for manufacturing the pouch of the secondary battery according to Embodiment 2 of the present invention is capable of obtaining more efficient results.

Particularly, since an amount of movement of the pouch base material suctioned into the accommodation groove is large in the vicinity of the bridge part 213, the first anti-pushing groove 221 and the second anti-pushing groove 222 may be formed, particularly, in an outer area of the bridge part 213.

At this time, the first anti-pushing groove 221 may be formed at a position spaced a distance of 5 mm or more upward from an upper end of the bridge part 213. That is, a distance d3 in FIG. 7 may be 5 mm or more. Similarly, the second anti-pushing groove 222 may be formed at a position spaced a distance of 5 mm or more downward from a lower end of the bridge part 213. That is, a distance d4 in FIG. 7 may be 5 mm or more.

When the pouch is molded while the punch 250 is inserted into the accommodation groove, a predetermined amount of pouch base material is suctioned into the accommodation groove while being stretched to some extend is required especially around the bridge. Thus, when each of the distances d3 and d4 is less than 5 mm, the stretchable amount may be insufficient to cause a phenomenon in which some areas of the pouch are broken. Therefore, when each of the distances d3 and d4 is formed to be 5 mm or more, it is possible to safely manufacture good products without fear of the breakage.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

1: Secondary battery
10: Pouch
11: Cup part of left pouch
12: Cup part of right pouch
13: Pouch bridge part
14: Peripheral portion of pouch
100, 200: Apparatus for manufacturing pouch of secondary battery
110, 210: Lower die
111, 211: Left accommodation groove
112, 212: Right accommodation groove
113, 213: Bridge part
114, 214: Base surface
120, 220: Anti-pushing groove
121, 221: First anti-pushing groove
122, 222: Second anti-pushing groove
123, 223: Third anti-pushing groove
124, 224: Fourth anti-pushing groove
130, 230: Stripper
131, 231: Anti-pushing protrusion
150, 250: Punch

The invention claimed is:

1. An apparatus for manufacturing a pouch of a secondary battery, the apparatus comprising:
a lower die, wherein an accommodation groove for molding a cup part of the pouch is formed in a base surface, wherein the base surface is configured to support thereupon the pouch, wherein the accommodation groove comprises a left accommodation groove, a right accommodation groove, and the base surface comprises a bridge part configured to connect the right and left accommodation grooves to each other is formed between the left accommodation groove and the right accommodation groove, wherein a first portion of the base surface comprises the left accommodation groove, a second portion of the base surface comprises the right accommodation groove, and wherein the first portion of the base surface and the second portion of the base surface define a V-shaped cross-section;
a punch configured to be inserted into the accommodation groove of the lower die to mold the cup part of the pouch; and
a stripper configured to press a peripheral portion of the pouch,
wherein the stripper and the lower die are configured to press and grip upper and lower portions of the peripheral portion of the pouch, respectively,
wherein, in the state in which the stripper and the lower die grip the peripheral portion of the pouch, the punch is configured to be inserted into the accommodation groove to mold the cup part of the pouch such that the peripheral portion of the pouch extends outside the punch, and
wherein an anti-pushing groove is formed in any one of the lower die or the stripper configured to press the peripheral portion of the pouch.

2. The apparatus of claim 1, wherein the anti-pushing groove is formed in the base surface of the lower die, and
wherein an anti-pushing protrusion having a protruding shape, protruding from a position corresponding to the anti-pushing groove, and configured to be inserted into the anti-pushing groove is formed on the stripper.

3. The apparatus of claim 2,
wherein the anti-pushing groove is formed in the base surface on an outer peripheral area of a molding area comprising the first portion of the base surface comprising the left accommodation groove, the second portion of the base surface comprising the right accommodation groove, and the bridge part.

4. The apparatus of claim 3, wherein the anti-pushing groove comprises a first anti-pushing groove and a second anti-pushing groove,
wherein, in a plan view of the lower die,
the first anti-pushing groove is provided in a shape extending in left and right directions at a position spaced a predetermined distance upward from the bridge part, and
the second anti-pushing groove is provided in a shape extending in the left and right directions at a position spaced a predetermined distance downward from the bridge part.

5. The apparatus of claim 4, wherein the anti-pushing groove further comprises a third anti-pushing groove and a fourth anti-pushing groove,
wherein, in a plan view of the lower die,
the third anti-pushing groove is provided in a shape extending in a vertical direction at a position spaced a predetermined distance from the left accommodation groove to a left side, and the fourth anti-pushing groove is provided in a shape extending in the vertical direction at a position spaced a predetermined distance from the right accommodation groove to a right side.

6. The apparatus of claim 5, wherein, in the plan view of the lower die, each of the first anti-pushing groove, the second anti-pushing groove, the third anti-pushing groove, and the fourth anti-pushing groove is formed in a rectangular shape.

7. The apparatus of claim 5, wherein, in the plan view of the lower die, each of the first anti-pushing groove and the second anti-pushing groove has a length less than that of the left and right accommodation grooves in a width direction, and each of the third anti-pushing groove and the fourth anti-pushing groove is formed to have a length equal to or greater than that of the left or right accommodation groove in a longitudinal direction.

8. The apparatus of claim 7, wherein the first anti-pushing groove and the second anti-pushing groove are symmetrical with respect to a virtual line (L) extending from the bridge part.

9. The apparatus of claim 4, wherein the first anti-pushing groove is formed at a position spaced a distance of 5 mm or more upward from an upper end of the bridge part, and the second anti-pushing groove is formed at a position spaced a distance of 5 mm or more downward from a lower end of the bridge part.

10. The apparatus of claim 1, wherein the anti-pushing groove is formed in the stripper, and wherein an anti-pushing protrusion having a protruding shape, protruding from a position corresponding to the anti-pushing groove, and configured to be inserted into the anti-pushing groove is formed on a pressing surface of the lower die.

* * * * *